(12) United States Patent
Axelsson et al.

(10) Patent No.: US 11,765,073 B2
(45) Date of Patent: Sep. 19, 2023

(54) MULTIPATH STREAMING SYSTEM AND METHOD FOR PROVIDING AT LEAST ONE STREAM OF DATA PACKETS FOR MEDIA AND/OR VIDEO FROM A TRANSMITTING NODE TO A RECEIVING NODE

(71) Applicant: Intinor AB, Umeå (SE)

(72) Inventors: Roland Axelsson, Umeå (SE); Björn Weinehall, Umeå (SE); Anders Martinsson, Umeå (SE)

(73) Assignee: Intinor AB, Umeå (SE)

( * ) Notice: Subject to any disclaimer, the term of this patent is extended or adjusted under 35 U.S.C. 154(b) by 0 days.

(21) Appl. No.: 18/003,673

(22) PCT Filed: Jun. 30, 2020

(86) PCT No.: PCT/EP2020/068333
§ 371 (c)(1),
(2) Date: Dec. 28, 2022

(87) PCT Pub. No.: WO2022/002359
PCT Pub. Date: Jan. 6, 2022

(65) Prior Publication Data
US 2023/0208752 A1   Jun. 29, 2023

(51) Int. Cl.
*H04L 45/24*   (2022.01)
*H04L 47/24*   (2022.01)
*H04L 47/28*   (2022.01)

(52) U.S. Cl.
CPC ............ *H04L 45/245* (2013.01); *H04L 47/24* (2013.01); *H04L 47/28* (2013.01)

(58) Field of Classification Search
None
See application file for complete search history.

(56) References Cited

U.S. PATENT DOCUMENTS

2003/0076840 A1   4/2003   Rajagopal et al.
2003/0202506 A1   10/2003   Perkins et al.

OTHER PUBLICATIONS

Search Report and Written Opinion received in International App. No. PCT/EP2020/068333, dated Feb. 26, 2021, in 13 pages.
Written Opinion received in International App. No. PCT/EP2020/068333, dated Mar. 17, 2021, in 11 pages.
International Preliminary Report on Patentability received in International App. No. PCT/EP2020/068333, dated Jul. 25, 2022, in 22 pages.

*Primary Examiner* — Hong Shao
(74) *Attorney, Agent, or Firm* — Knobbe, Martens, Olson & Bear, LLP

(57) ABSTRACT

A multipath streaming method and system provide at least one stream of data packets for media and/or video from a transmitting node to a receiving node. The system includes a transmitting node configured to transmit data packets via at least two network connection paths, a receiving node configured to receive data packets via at least two network connection paths, and at least one proxy node configured to relay data packets received from the transmitting node to the receiving node. Processing circuitry is configured to send data packets from the transmitting node to the receiving node via a first network connection path, and send data packets from the transmitting node to the receiving node via at least one proxy node via at least a second network connection path.

13 Claims, 4 Drawing Sheets

MULTIPATH STREAMING SYSTEM AND METHOD FOR PROVIDING AT LEAST ONE STREAM OF DATA PACKETS FOR MEDIA AND/OR VIDEO FROM A TRANSMITTING NODE TO A RECEIVING NODE

TECHNICAL FIELD

The present disclosure relates to a system, a method, and a computer program product for providing a stream of data packets for media and/or video from a transmitting node to a receiving node.

BACKGROUND ART

Streaming of data packets for media and/or video over the Internet from a transmitting node to a receiving node can sometimes be troublesome if the stream of data packets is interrupted or delayed since often media and/or video is desired to be viewed by a person in real-time, e.g. sport events. This makes the streaming of data packets for media and/or video more vulnerable compare to sending data packets that are not time critical or sending data packets that can arrive in different order etc. Streaming of data packets for media and/or video over the Internet from a transmitting node to a receiving node via a point-to-point network connection path can be affected by network interruptions due to the lack of redundancy of data packets if the point-to-point network path is e.g. congested or affected by the availability of the network. There are different error correction methods that can be used to minimize the loss of data packets, however data packets that are routed by a common Internet Protocol from the transmitting node to the receiving node over the Internet may be congested and/or delayed to a degree when error correction methods are useless, which e.g. has a negative effect of the user experience when consuming real-time media and/or viewing real-time video.

SUMMARY

There is a demand for more reliable streaming of data packets for media and/or video over the Internet from a transmitting node to a receiving node. One problem with the available solutions is that sometimes too many data packets are lost or delayed due to e.g. congestions on the established network connection path. Another problem is that control of the network connection path is in the hands of the common Internet Protocol and the stream of data packets as defined by the Internet Protocol cannot be controlled. In particular data packets are routed over the Internet with no control of physical geographical destinations defining the network connection path.

It is an object of the present disclosure to mitigate, alleviate or eliminate one or more of the above-identified deficiencies and disadvantages in the prior art and solve at least the above mentioned problem.

According to a first aspect there is provided a multipath streaming system for providing at least one stream of data packets for media and/or video from a transmitting node to a receiving node. The multipath streaming system comprises a transmitting node configured to transmit data packets via at least two network connection paths, a receiving node configured to receive data packets via at least two network connection paths and at least one proxy node configured to relay data packets received from the transmitting node to the receiving node. The multipath streaming system further comprises a processing circuitry configured to be operatively connected to at least one of the transmitting node, the receiving node and the at least one proxy node. The processing circuitry is configured to send data packets from the transmitting node to the receiving node via a first network connection path, wherein the first network connection path is a point-to-point network connection path between the transmitting node and the receiving node, send data packets from the transmitting node to the receiving node via at least one proxy node via at least a second network connection path, receive, at the receiving node, data packets from the transmitting node via the first network connection path, and receive, at the receiving node, data packets from the transmitting node sent via the at least one proxy node via the at least second network connection path.

One advantage with this aspect is that the at least one proxy node is a physical entity that can be placed at a geographical location and data packets received from the transmitting node are relayed to the receiving node by the at least one proxy node which forces the second network connection path to pass the geographical location of the proxy node to generate a redundant stream of data packets different from the first network connection path that is a point-to-point network connection path between the transmitting node and the receiving node.

According to some embodiments, the processing circuitry is further configured to send data packets from the transmitting node to the receiving node via the first network connection path, and send data packets from the transmitting node to the receiving node via the second network connection path simultaneously, and aggregate data packets received via the first network connection path and data packets received via the second network connection path at the receiving node for generating a redundant stream of data packets.

One advantage with this embodiment is that data packets can be sent from the transmitting node to the receiving node via the first network connection path and at the same time, or within a predetermined time period, redundant data packets can be sent from the transmitting node to the receiving node via the second network connection path and data packets together with redundant data packets can be aggregated at the receiving node for generating a redundant stream of data packets.

According to some embodiments, the processing circuitry is further configured to detect a change in latency or detect a change in loss of data packets in the stream of data packets in any of the first network connection path and the second network connection path, and adjust, at the transmitting node, the amount of data packets to be sent via the first network connection path and the amount of data packets to be sent via the second network connection path based on the change in latency or change in loss of data packets.

One advantage with this embodiment is that the amount of data packets to be sent via the first network connection path and the amount of data packets to be sent via the second network connection path, can be dynamically balanced in order to generate a useful redundant stream of data packets via any of the first network connection path and the second network connection path dependent on historically detected changes in latency and/or historically detected changes in data packet loss for each connection path.

According to some embodiments, the at least one network connection path is established via at least one network connection link connecting the transmitting node with the network.

According to some embodiments, the at least one network connection path is established via at least one network connection link connecting the transmitting node with the network, wherein the at least one network connection link is a wireless communication link.

According to some embodiments, the at least one network connection path is established via at least one network connection link connecting the transmitting node with the network, wherein the at least one network connection link is a wired communication link.

One advantage with this embodiment is that one network connection link, but also plural network connection links, can be used for establishing the at least one network connection path, and in the embodiment when plural network connection links are used, each additional network connection link can be used as a redundant network connection link which in turn generates a redundant stream of data packets via the at least one network connection path.

According to some embodiments, the processing circuitry is further configured to detect a change in latency or detect a change in loss of data packets in the stream of data packets in any of the first network connection path and the second network connection path, and adjust, at the transmitting node, the amount of data packets to be sent via a first network connection link and a second network connection link based on the change in latency or change in loss of data packets in any of the first network connection path and the second network connection path.

One advantage with this embodiment is that the amount of data packets to be sent via the first network connection link and the amount of data packets to be sent via the second network connection link, can be dynamically balanced in order to generate a useful redundant stream of data packets via any of the first network connection link and the second network connection link dependent on historically detected changes in latency and/or historically detected changes in data packet loss in any of the first network connection path and the second network connection path.

According to some embodiments, the processing circuitry is further configured to obtain a desired priority rank parameter associated with transmitting data packets via any of the at least one network connection link and/or the at least one proxy node, and adjust, at the transmitting node, the amount of data packets to be sent via the at least one network connection link and/or the at least one proxy node based on the desired priority rank parameter.

One advantage with this embodiment is that the amount of data packets to be sent via the at least one network connection link and/or the amount of data packets to be sent via the at least one proxy node, can be dynamically balanced in order to generate a desired amount of data to be sent via any of the at least one network connection link and/or the at least one proxy node dependent on the desired priority rank parameter.

According to some embodiments, the stream of data packets via the second network connection path are sent via a first proxy node and a second proxy node that are connected in serial for adjusting the route of the second network connection path.

One advantage with this aspect is that the first proxy node is a physical entity that is placed at a first geographical location and the second proxy node is a physical entity that is placed at a second geographical location, and hence the route of the second network connection path can be controlled to pass via the first geographical location and the second geographical location by adding the second proxy node in serial to the first proxy node.

According to some embodiments, the stream of data packets is sent from the transmitting node to the receiving node via a third network connection path wherein the third network connection path directs the stream of data packets via a second proxy node that is connected in parallel to the first proxy node.

One advantage with this aspect is that the first proxy node is a physical entity that is placed at a first geographical location and the second proxy node is a physical entity that is placed at a second geographical location, and hence the route of the second network connection path can be controlled to pass via the first geographical location and the route of the third network connection path can be controlled to pass via the second geographical location by adding the second proxy node in parallel to the first proxy node and thereby control the route of a second redundant stream of data packets.

According to some embodiments, the stream of data packets sent via the first network connection path is sent as a redundant stream of data packets via the at least second network connection path for generating a redundant stream of data packets.

One advantage with this aspect is that the first network connection path and the at least second network connection path together establishes a more reliable stream of data packets and further added network connection paths, add further redundancy which makes the multipath streaming system even more reliable.

According to a second aspect there is provided a method for providing at least one stream of data packets for media and/or video from a transmitting node to a receiving node, the method comprising sending data packets from a transmitting node to a receiving node via a first network connection path, wherein the first network connection path is a point-to-point network connection path between the transmitting node and the receiving node, sending data packets from the transmitting node to the receiving node via at least one proxy node via at least a second network connection path, receiving, at the receiving node, data packets from the transmitting node via the first network connection path, and receiving, at the receiving node, data packets from the transmitting node sent via the at least one proxy node via the at least second network connection path.

One advantage with this aspect is that data packets received from the transmitting node are relayed to the receiving node by the at least one proxy node which forces the second network connection path to pass the geographical location of the proxy node to generate a redundant stream of data packets different from the first network connection path that is a point-to-point network connection path between the transmitting node and the receiving node.

According to some embodiments the method comprises sending data packets from the transmitting node to the receiving node via the first network connection path, and sending data packets from the transmitting node to the receiving node via the second network connection path simultaneously, and aggregating data packets received via the first network connection path and data packets received via the second network connection path at the receiving node for generating a redundant stream of data packets.

One advantage with this embodiment is that data packets can be sent from the transmitting node to the receiving node via the first network connection path and at the same time, or within a predetermined time period, redundant data packets can be sent from the transmitting node to the receiving node via the second network connection path and data packets together with redundant data packets can be aggregated at the receiving node for generating a redundant stream of data packets.

According to some embodiments the method comprises detecting, a change in latency or change in loss of data packets in the stream of data packets in any of the first network connection path and the second network connection path, and adjusting, at the transmitting node, the amount of data packets to be sent via the first network connection path and the amount of data packets to be sent via the second network connection path based on the change in latency or change in loss of data packets.

One advantage with this embodiment is that the amount of data packets to be sent via the first network connection path and the amount of data packets to be sent via the second network connection path, can be dynamically balanced in order to generate a useful redundant stream of data packets via any of the first network connection path and the second network connection path dependent on historically detected changes in latency and/or historically detected changes in data packet loss for each connection path.

According to some embodiments the method comprises detecting, a change in latency or change in loss of data packets in the stream of data packets in any of the first network connection path and the second network connection path, and adjusting, at the transmitting node, the amount of data packets to be sent via a first network connection link and a second network connection link based on the change in latency or change in loss of data packets in any of the first network connection path and the second network connection path.

One advantage with this embodiment is that the amount of data packets to be sent via the first network connection link and the amount of data packets to be sent via the second network connection link, can be dynamically balanced in order to generate a useful redundant stream of data packets via any of the first network connection link and the second network connection link dependent on historically detected changes in latency and/or historically detected changes in data packet loss in any of the first network connection path and the second network connection path.

According to some embodiments, the method comprises obtaining a desired priority rank parameter for transmitting data packets via any of the at least one network connection link and/or the at least one proxy node, and adjusting, at the transmitting node, the amount of data packets to be sent via the at least one network connection link and/or the at least one proxy node based on the desired priority rank parameter.

One advantage with this embodiment is that the amount of data packets to be sent via the at least one network connection link and/or the amount of data packets to be sent via the at least one proxy node, can be dynamically balanced in order to generate a desired amount of data to be sent via any of the at least one network connection link and/or the at least one proxy node dependent on the desired priority rank parameter.

According to a third aspect there is provided a computer program product comprising a non-transitory computer readable medium, having thereon a computer program comprising program instructions, the computer program being loadable into a processing circuitry and configured to cause execution of the method when the computer program is run by the at least one processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1A:
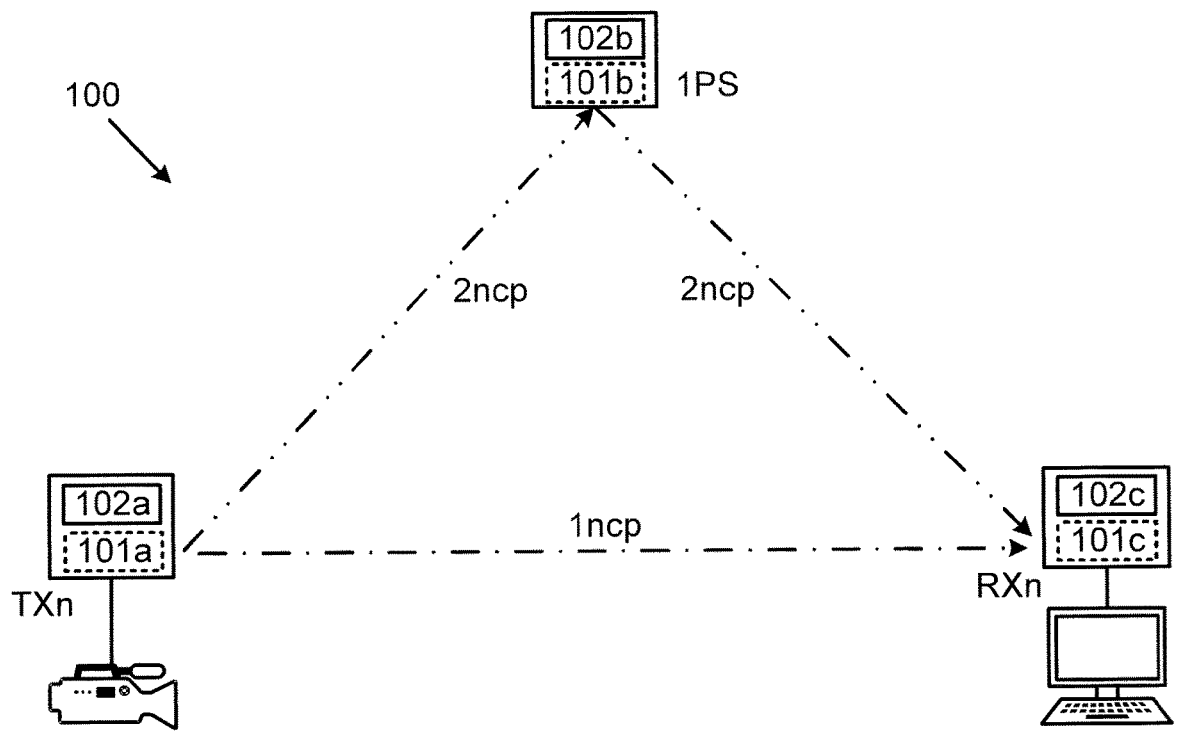
FIG. 1a illustrates a multipath streaming system with a first and a second network connection paths according to an embodiment of the present disclosure.

FIG. 1a illustrates a multipath streaming system with a first and a second network connection paths according to an embodiment of the present disclosure.

The first aspect of this disclosure shows a multipath streaming system 100 for providing at least one stream of data packets for media and/or video from a transmitting node TXn to a receiving node RXn. The multipath streaming system 100 comprises a transmitting node TXn configured to transmit data packets via at least two network connection paths 1ncp, 2ncp, . . . nncp, a receiving node RXn configured to receive data packets via at least two network connection paths 1ncp, 2ncp, . . . nncp and at least one proxy node 1PS, 2PS, . . . , nPS configured to relay data packets received from the transmitting node TXn to the receiving node RXn.

According to some embodiments the network 50 is the Internet. According to some embodiments the network connection path 1ncp, 2ncp, . . . nncp is an Internet connection path. According to some embodiments the network connection path 1ncp, 2ncp, . . . nncp is an Internet connection path wherein common Internet Protocols are used for routing the data packets. According to some embodiments the network connection path 1ncp, 2ncp, . . . nncp is an intranet connection path, e.g. in a large building, campus or factory.

According to some aspects the transmitting node TXn is a physical device that is e.g. configured to transmit data packets for media and/or video. In an example the transmitting node TXn is operatively connected to a media generating device and/or video camera device as illustrated in FIG. 1a.

According to some aspects the receiving node RXn is a physical device that is e.g. configured to receive data packets for media and/or video. In an example the receiving node RXn is operatively connected to a device configured to view media and/or video such as a computer or television set as illustrated in FIG. 1a. In an example the receiving node RXn is operatively connected to a device configured to manage media and/or video at an Internet service provider, an Internet media streaming provider or a media/video broadcasting provider.

According to an aspect the at least one proxy node 1PS, 2PS, . . . , nPS configured to relay data packets received from the transmitting node TXn to the receiving node RXn is a physical device. According to some embodiments the proxy node 1PS, 2PS, . . . , nPS is a proxy server.

In one example the transmitting node TXn is located at a first geographical location that is remote from the receiving node RXn that is located at a second geographical location.

In one example the transmitting node TXn is located at a first geographical location, the receiving node RXn is located at a second geographical location, and the proxy node 1PS, 2PS, . . . , nPS is located at a third geographical location.

The multipath streaming system 100 comprises a processing circuitry 102a, 102b, 102c configured to be operatively connected to at least one of the transmitting node TXn, the receiving node RXn and the at least one proxy node 1PS, 2PS, . . . , nPS.

According to some embodiments the processing circuitry 102a is a processing circuitry of the transmitting node TXn as illustrated in FIG. 1a. In an example the transmitting node TXn is a portable electronic device and the processing circuitry 102a is a processing circuitry of the portable electronic device. According to some embodiments the processing circuitry 102b is a processing circuitry of the at least one proxy node 1PS, 2PS, . . . , nPS as illustrated in Figure 1a. In an example the at least one proxy node 1PS, 2PS, . . . , nPS is a proxy server and the processing circuitry 102b is a processing circuitry of the proxy server. According to some embodiments the processing circuitry 102c is a processing circuitry of the receiving node RXn as illustrated in FIG. 1a. In an example the receiving node RXn is a computer and the processing circuitry 102c is the processing circuitry of the computer.

According to some embodiments the multipath streaming system 100 further comprises a memory 101a, 101b, 101c configured to be operatively connected to at least one of the transmitting node TXn, the receiving node RXn and the at least one proxy node 1PS, 2PS, . . . , nPS. According to some embodiments the memory 101a is a memory of the transmitting node TXn as illustrated in FIG. 1a. In an example the transmitting node TXn is a portable electronic device and the memory 101a is a memory of the portable electronic device. According to some embodiments the memory 101b is a memory of the at least one proxy node 1PS, 2PS, . . . , nPS as illustrated in FIG. 1a. In an example the at least one proxy node 1PS, 2PS, . . . , nPS is a proxy server and the memory 101b is a memory of the proxy server. According to some embodiments the memory 101c is a memory of the receiving node RXn as illustrated in FIG. 1a. In an example the receiving node RXn is a computer and the memory 101c is the memory of the computer.

The processing circuitry 102a, 102b, 102c is configured to send data packets from the transmitting node TXn to the receiving node RXn via a first network connection path 1ncp, as illustrated in FIG. 1a, wherein the first network connection path 1ncp is a point-to-point network connection path between the transmitting node TXn and the receiving node RXn.

The processing circuitry 102a, 102b, 102c is further configured to send data packets from the transmitting node TXn to the receiving node RXn via at least one proxy node 1PS, 2PS, . . . , nPS via at least a second network connection path 2ncp, as illustrated in FIG. 1a, and receive, at the receiving node RXn, data packets from the transmitting node TXn via the first network connection path 1ncp, and receive, at the receiving node RXn, data packets from the transmitting node TXn sent via the at least one proxy node 1PS, 2PS, . . . , nPS via the at least second network connection path 2ncp, also illustrated in FIG. 1a.

One advantage with this aspect is that the at least one proxy node is a physical entity that can be placed at a geographical location and data packets received from the transmitting node are relayed to the receiving node by the at least one proxy node which forces the second network connection path to pass the geographical location of the proxy node to generate a redundant stream of data packets different from the first network connection path that is a point-to-point network connection path between the transmitting node and the receiving node.

Figure 1B:
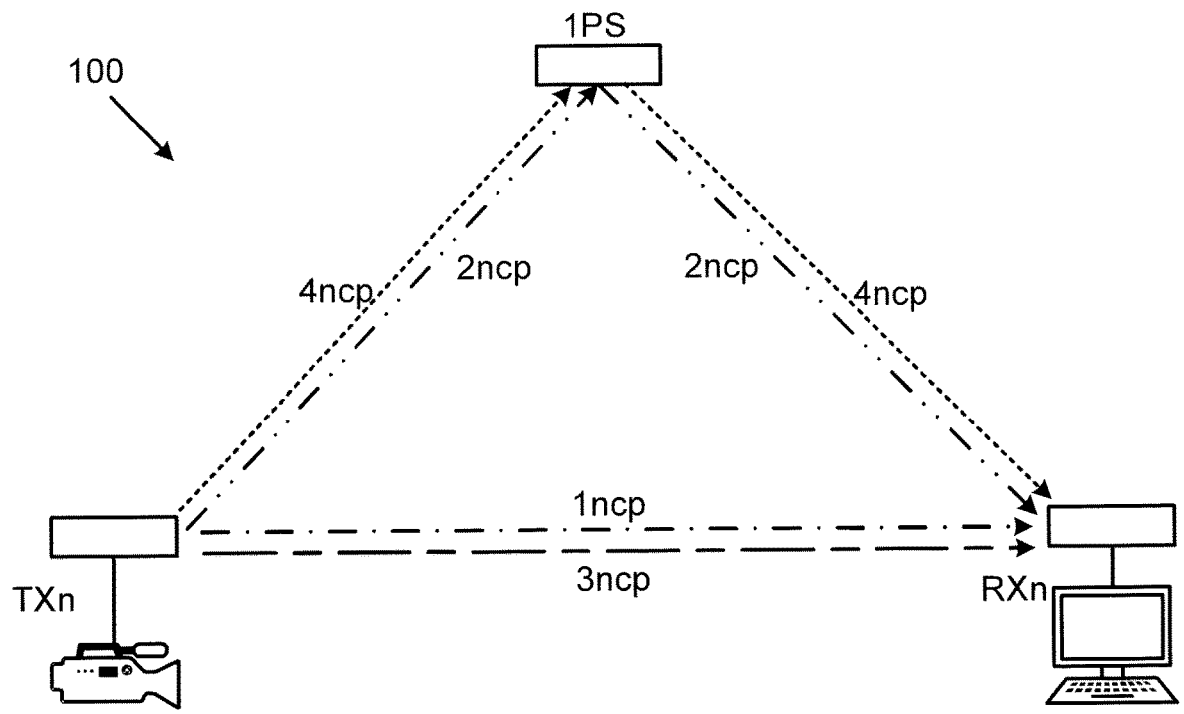
FIG. 1b illustrates a multipath streaming system with a first, second, third and fourth network connection paths according to an embodiment of the present disclosure.

According to some embodiments the processing circuitry 102a, 102b, 102c is further configured to send data packets from the transmitting node TXn to the receiving node RXn via at least one proxy node 1PS, 2PS, . . . , nPS via at least a second network connection path 2ncp and a fourth network connection path 4ncp, as illustrated in FIG. 1b, and receive, at the receiving node RXn, data packets from the transmitting node TXn via a first network connection path 1ncp and a third network connection path 3ncp, as illustrated in FIG. 1b, and receive, at the receiving node RXn, data packets from the transmitting node TXn sent via the at least one proxy node 1PS, 2PS, . . . , nPS via the at least second network connection path 2ncp and the fourth network connection path 4ncp, also illustrated in FIG. 1b.

According to some embodiments the processing circuitry 102a, 102b, 102c is further configured to send data packets from the transmitting node TXn to the receiving node RXn via the first network connection path 1ncp, and send data packets from the transmitting node TXn to the receiving node RXn via the second network connection path 2ncp simultaneously, and aggregate data packets received via the first network connection path 1ncp and data packets received via the second network connection path 2ncp at the receiving node RXn for generating a redundant stream of data packets.

According to some embodiments the data packets sent via the first network connection path 1ncp are sent as redundant data packets via the second network connection path 2ncp.

According to some embodiments the information content of the data packets sent via the first network connection path 1ncp is the same information content of the data packets sent via the second network connection path 2ncp.

According to some embodiments Forward Error Correction, FEC, is used to create extra data packets at the transmitting node TXn comprising redundant data.

According to some embodiments Automatic Repeat reQuest, ARQ, is used to re-send data packets from the transmitting node TXn comprising redundant data.

According to some embodiments Forward Error Correction, FEC, and Automatic Repeat reQuest, ARQ, are used simultaneously.

According to some embodiments aggregating data packets received via the first network connection path 1ncp and data packets received via the second network connection path 2ncp at the receiving node RXn comprising re-creating lost data packets by comparing received data packets received via the first network connection path 1ncp and data packets received via the second network connection path 2ncp.

According to some embodiments sending data packets from the transmitting node TXn to the receiving node RXn via the first network connection path 1ncp, and sending data packets from the transmitting node TXn to the receiving node RXn via the second network connection path 2ncp simultaneously meaning sending data packets from the transmitting node TXn to the receiving node RXn via the first network connection path 1ncp, and sending data packets from the transmitting node TXn to the receiving node RXn via the second network connection path 2ncp within a predefined time period. In an example the predefined time period is a few milliseconds. In an example simultaneously sending packets meaning that packets are on their way from the transmitting node TXn to the receiving node RXn via the first network connection path 1ncp and via the second network connection path 2icpncp at the same time.

One advantage with this embodiment is that data packets can be sent from the transmitting node to the receiving node via the first network connection path and at the same time, or within a predetermined time period, redundant data packets can be sent from the transmitting node to the receiving node via the second network connection path and data packets together with redundant data packets can be aggregated at the receiving node for generating a redundant stream of data packets.

A further advantage with this embodiment is that even if one of the first network connection path 1ncp and the second network connection path 2ncp fails to function, the data packets sent from the transmitting node TXn will reach the receiving node RXn via the remaining network connection path that is functioning. In an example first network connection path 1ncp and the second network connection path 2ncp are geographically separated which generates a redundancy by the different physical networks used for transporting the data packets.

According to some embodiments the processing circuitry 102a, 102b, 102c is further configured to detect a change in latency or detect a change in loss of data packets in the stream of data packets in any of the first network connection path 1ncp and the second network connection path 2ncp, and adjust, at the transmitting node TXn, the amount of data packets to be sent via the first network connection path 1ncp and the amount of data packets to be sent via the second network connection path 2ncp based on the change in latency or change in loss of data packets.

According to some embodiments, the latency or the loss of data packets in the stream of data packets is detected at the transmitting node TXn determined by received error information from the receiving node RXn indicative of a latency or the loss of data packets.

According to some embodiments, the latency or the loss of data packets in the stream of data packets is detected at any of the transmitting node TXn, the receiving node RXn and the at least one proxy node 1PS, 2PS, . . . , nPS.

According to some embodiments a change in latency is only detected if the latency is above a predetermined threshold value. According to some embodiments a loss of data is only detected if the amount of lost data packets is above a predetermined threshold value. In an example a certain change in latency is accepted before the amount of data packets is adjusted. In an example a certain amount of lost data packets is accepted before the amount of data packets is adjusted. According to some embodiments the amount of data packets is adjusted by adjusting at least any of the coding of the data packets, the content of the data packets, the resolution of image information in the data packets, and the sound quality of sound information in the data packets.

One advantage with this embodiment is that the amount of data packets to be sent via the first network connection path and the amount of data packets to be sent via the second network connection path, can be dynamically balanced in order to generate a useful redundant stream of data packets via any of the first network connection path and the second network connection path dependent on historically detected changes in latency and/or historically detected changes in data packet loss for each connection path.

According to some embodiments the at least one network connection path 1ncp, 2ncp, . . . nncp is established via at least one network connection link 1ncl, 2ncl, . . . , nncl connecting the transmitting node TXn with the network 50.

According to some embodiments the at least one network connection path 1ncp, 2ncp, . . . nncp is established via at least one network connection link 1ncl, 2ncl, . . . , nncl connecting the transmitting node TXn with the network 50, wherein the at least one network connection link 1ncl, 2ncl, . . . , nncl is a wireless communication link.

According to some embodiments the at least one network connection path 1ncp, 2ncp, . . . nncp is established via at least one network connection link 1ncl, 2ncl, . . . , nncl connecting the transmitting node TXn with the network 50, wherein the at least one network connection link 1ncl, 2ncl, . . . , nncl is a wired communication link.

According to some embodiments the at least one network connection path 1ncp, 2ncp, . . . nncp is established via at least one network connection link 1ncl, 2ncl, . . . , nncl connecting the receiving node RXn with the network 50, wherein the at least one network connection link 1ncl, 2ncl, . . . , nncl is a wired communication link.

According to some embodiments the at least one network connection link 1ncl, 2ncl, . . . , nncl is a standardized wireless local area network connection link such as a Wireless Local Area Network, WLAN, Bluetooth™, Zig- Bee, Ultra-Wideband, UWB, Radio Frequency Identification, RFID, or similar network. According to some embodiments the at least one network connection link 1ncl, 2ncl, ..., nncl is a standardized wireless wide area network connection link such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some embodiments the at least one network connection link 1ncl, 2ncl, ..., nncl can also be a combination of both a wireless local area network connection link and a wireless wide area network connection link. According to some embodiments the at least one network connection link 1ncl, 2ncl, ..., nncl is a combination of a wired communication network and a wireless communication network.

According to some embodiments different network connection links 1ncl, 2ncl, ..., nncl may be operated by different network operators.

Figure 2A:
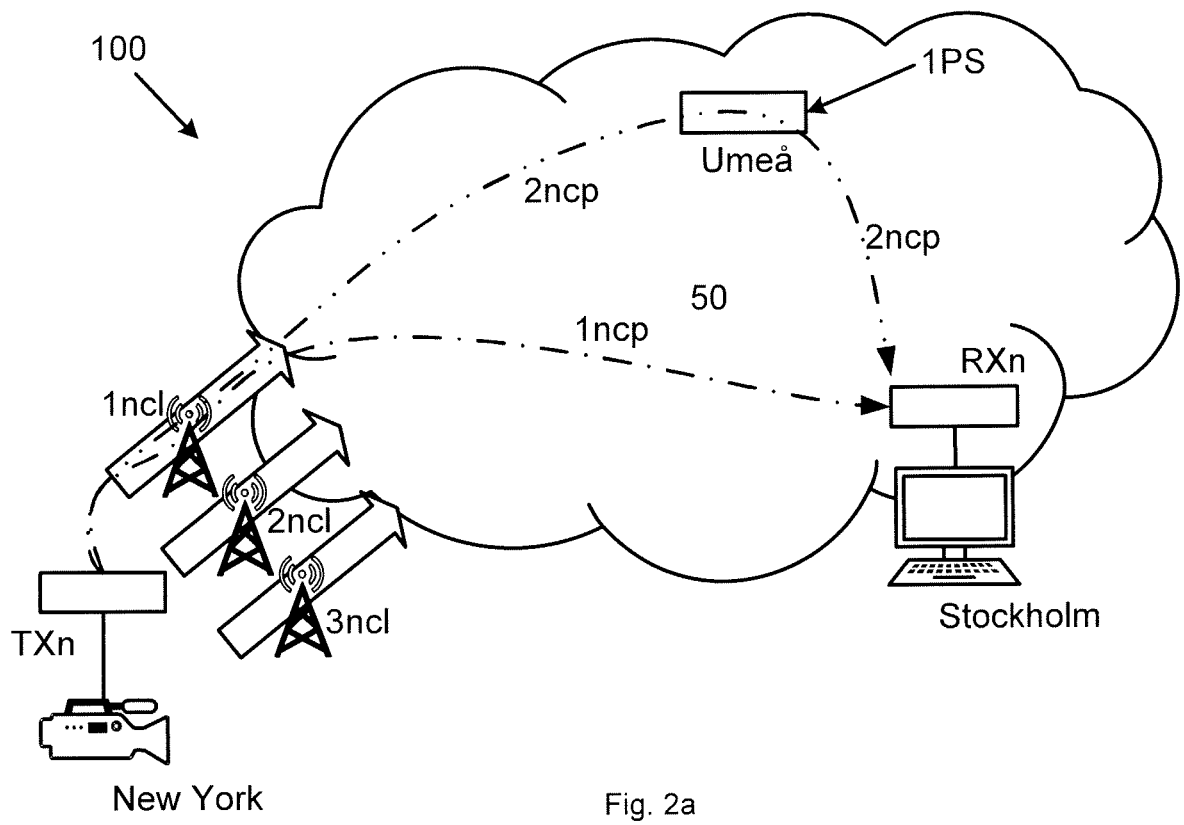
FIG. 2a illustrates a multipath streaming system with one network connection link and a first and a second network connection paths according to an embodiment of the present disclosure.

According to some embodiments the first network connection path 1ncp and the second network connection path 2ncp are established via a first network connection link 1ncl. FIG. 2a illustrates that the first network communication link 1ncl is used for establishing both the first network connection path 1ncp and the second network connection path 2ncp.

Figure 2B:
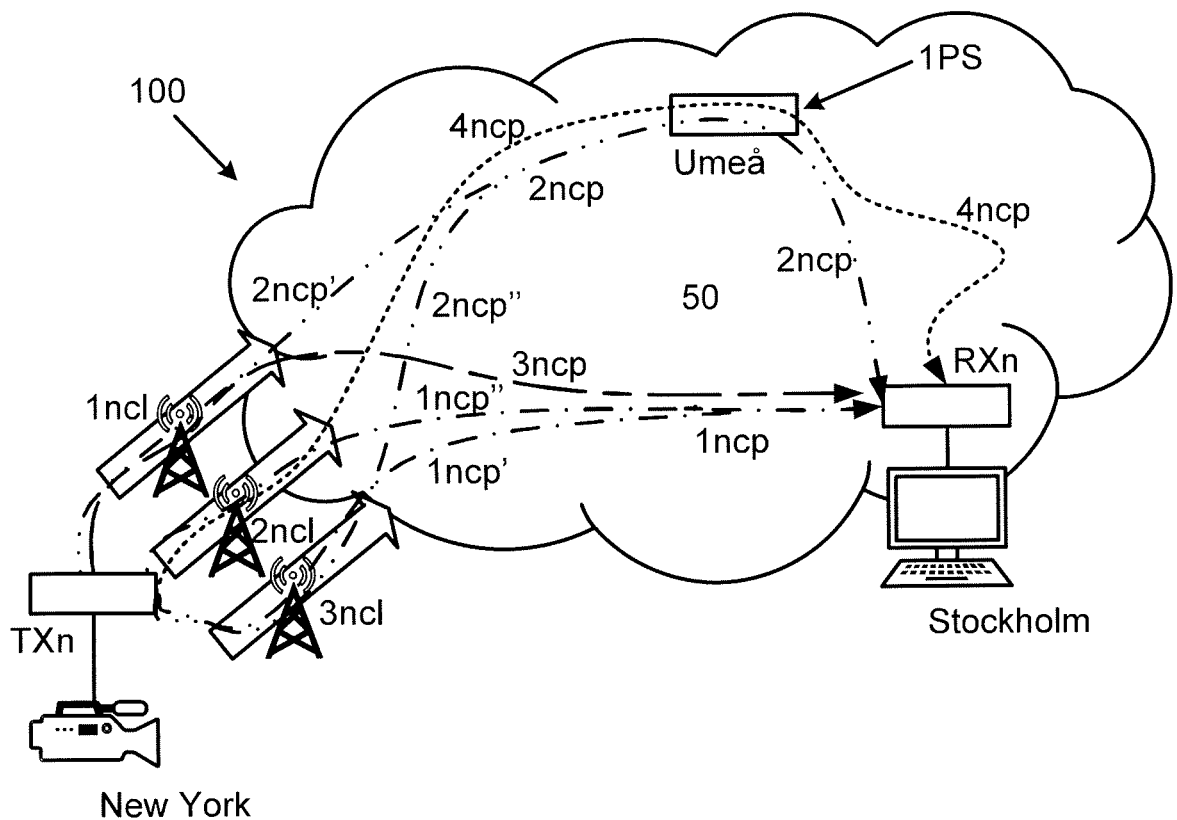
FIG. 2b illustrates a multipath streaming system with three network connection links and a first, second, third and fourth network connection paths according to an embodiment of the present disclosure.

According to some embodiments, and as illustrated in FIG. 2b, the first network connection path 1ncp is established via a first network connection link 1ncl and a second network connection link 2ncl wherein data packets sent via the first network connection link 1ncl is a first stream of data packets of the first network connection path 1ncp' and wherein data packets sent via the second network connection link 2ncl is a second stream of data packets of the first network connection path 1ncp" that are merged into the one stream of data packets of the first Network connection path 1ncp.

In the example in FIG. 2b, the second network connection path 2ncp is established via the first network connection link 1ncl and the third network connection link 3ncl.

According to some embodiments at least one network connection path 1ncp, 2ncp, ... nncp is established via at least one network connection link 1ncl, 2ncl, ..., nncl.

According to some embodiments the at least one network connection path 1ncp, 2ncp, ... nncp is established via the at least one network connection link 1ncl, 2ncl, ..., nncl dynamically dependent on at least any of the available bandwidth, the Quality of Service, the connection speed, the availability or the radio coverage of the at least one network connection link 1ncl, 2ncl, ..., nncl.

According to some embodiments network connection links 1ncl, 2ncl, ..., nncl are dynamically assigned to establish the at least one network connection path 1ncp, 2ncp, ... nncp to maintain a redundant connection of the transmitting node TXn to the network 50.

FIG. 2b further illustrates how plural network connection paths 1ncp, 2ncp, 3ncp and 4ncp, are using different network connection links 1ncl, 2ncl, 3ncl.

One advantage with this embodiment is that one network connection link, but also plural network connection links, can be used for establishing the at least one network connection path, and in the embodiment when plural network connection links are used, each additional network connection link can be used as a redundant network connection link which in turn generates a redundant stream of data packets via the at least one network connection path.

According to some embodiments the at least one network connection path 1ncp, 2ncp, ... nncp is established via at least one network connection link connecting the receiving node RXn with the network 50.

According to some embodiments the at least one network connection path 1ncp, 2ncp, ... nncp is established via at least one network connection link connecting the receiving node RXn with the network 50, wherein the at least one network connection link is a wireless communication link.

According to some embodiments the processing circuitry 102a, 102b, 102c is further configured to detect a change in latency or detect a change in loss of data packets in the stream of data packets in any of the first network connection path 1ncp and the second network connection path 2ncp, and adjust, at the transmitting node TXn, the amount of data packets to be sent via a first network connection link 1ncl and a second network connection link 2ncl based on the change in latency or change in loss of data packets in any of the first network connection path 1ncp and the second network connection path 2ncp.

According to some embodiments a change in latency is only detected if the latency is above a predetermined threshold value. According to some embodiments a loss of data is only detected if the amount of lost data packets is above a predetermined threshold value. In an example a certain change in latency is accepted before the amount of data packets is adjusted. In an example a certain amount of lost data packets is accepted before the amount of data packets is adjusted.

One advantage with this embodiment is that the amount of data packets to be sent via the first network connection link and the amount of data packets to be sent via the second network connection link, can be dynamically balanced in order to generate a useful redundant stream of data packets via any of the first network connection link and the second network connection link dependent on historically detected changes in latency and/or historically detected changes in data packet loss in any of the first network connection path and the second network connection path.

According to some embodiments the processing circuitry 102a, 102b, 102c is further configured to obtain a desired priority rank parameter associated with transmitting data packets via any of the at least one network connection link 1ncl, 2ncl, ..., nncl and/or the at least one proxy node 1PS, 2PS, ..., nPS, and adjust, at the transmitting node TXn, the amount of data packets to be sent via the at least one network connection link 1ncl, 2ncl, ..., nncl and/or the at least one proxy node 1PS, 2PS, ..., nPS based on the desired priority rank parameter.

According to some embodiments a priority rank parameter is a predetermined value that is associated with the at least one network connection link 1ncl, 2ncl, ..., nncl and/or the at least one proxy node 1PS, 2PS, ..., nPS and stored in a memory 101a, 101b, 101c.

According to some embodiments the processing circuitry 102a, 102b, 102c is configured to obtain a desired priority rank parameter from a memory 101a, 101b, 101c.

According to some embodiments a threshold value or a desired value of the priority rank parameter is predetermined and stored in the memory 101a, 101b, 101c. In an example, an operator of the multipath streaming system 100 can input a desired threshold value or desired value of a priority rank parameter via a user interface operatively connected to the processing circuitry 102a, 102b, 102c of the multipath streaming system 100.

According to some embodiments the at least one network connection link 1ncl, 2ncl, ..., nncl and/or the at least one proxy node 1PS, 2PS, ..., nPS is associated with a predetermined priority rank parameter.

According to some embodiments the priority rank parameter is dependent on the data packet security when transmitting data packets via any of the at least one network connection link 1ncl, 2ncl, ..., nncl and/or the at least one proxy node 1PS, 2PS, ..., nPS. In an example the priority rank parameter is indicative of a secure network connection link 1ncl, 2ncl, ..., nncl and/or proxy node 1PS, 2PS, ..., nPS. According to some embodiments data packets are not sent via a network connection link 1ncl, 2ncl, ..., nncl or proxy node 1PS, 2PS, ..., nPS if the desired priority rank parameter is below a predetermined desired threshold value of the priority rank parameter.

According to some embodiments the priority rank parameter is dependent on the energy consumption when transmitting data packets via any of the at least one network connection link 1ncl, 2ncl, ..., nncl and the at least one proxy node 1PS, 2PS, ..., nPS. In an example the priority rank parameter is indicative of a sustainable network connection link 1ncl, 2ncl, ..., nncl and/or proxy node 1PS, 2PS, ..., nPS. According to some embodiments data packets are not sent via a network connection link 1ncl, 2ncl, ..., nncl or proxy node 1PS, 2PS, ..., nPS if the priority rank parameter is below a predetermined threshold value defined by the desired priority rank parameter. In an example data packets are not sent via any of the at least one network connection link 1ncl, 2ncl, ..., nncl and the at least one proxy node 1PS, 2PS, ..., nPS if the priority rank parameter is indicative of non-sustainable energy consumption when transmitting data packets via any of the at least one network connection link 1ncl, 2ncl, ..., nncl and the at least one proxy node 1PS, 2PS, ..., nPS.

According to some embodiments the priority rank parameter is dependent on the radio network interface standard when transmitting data packets via any of the at least one network connection link 1ncl, 2ncl, ..., nncl and/or the at least one proxy node 1PS, 2PS, ..., nPS. In an example the priority rank parameter is indicative of a certain radio network interface standard. According to some embodiments data packets are not sent via a network connection link 1ncl, 2ncl, ..., nncl or proxy node 1PS, 2PS, ..., nPS if the priority rank parameter is indicative of certain radio network interface standard other than the network interface standard defined by the desired priority rank parameter. In an example a first radio network interface standard is a Wideband Code Division Multiple Access radio network interface a second radio network interface standard is a Wireless Local Area Network radio network interface and data packets are not sent via any of the at least one network connection link 1ncl, 2ncl, ..., nncl and the at least one proxy node 1PS, 2PS, ..., nPS if the desired priority rank parameter is indicative of the first radio network interface standard, Wideband Code Division Multiple Access. In one example fewer data packets are sent via the first radio network interface standard, Wideband Code Division Multiple Access, but the majority of data packets are sent via the second radio network interface standard, Wireless Local Area Network.

According to some embodiments the priority rank parameter is dependent on the cost when transmitting data packets via any of the at least one network connection link 1ncl, 2ncl, ..., nncl and the at least one proxy node 1PS, 2PS, ..., nPS. According to some embodiments data packets are not sent via a network connection link 1ncl, 2ncl, ..., nncl or proxy node 1PS, 2PS, ..., nPS if the priority rank parameter is indicative of a cost that is above a threshold value defined by the desired priority rank parameter. According to some embodiments a reduced amount of data packets are sent via a network connection link 1ncl, 2ncl, ..., nncl or proxy node 1PS, 2PS, ..., nPS if the priority rank parameter is indicative of a cost that is above a threshold value defined by the desired priority rank parameter.

One advantage with this embodiment is that the amount of data packets to be sent via the at least one network connection link and/or the amount of data packets to be sent via the at least one proxy node, can be dynamically balanced in order to generate a desired amount of data to be sent via any of the at least one network connection link and/or the at least one proxy node dependent on the desired priority rank parameter.

Figure 3A:
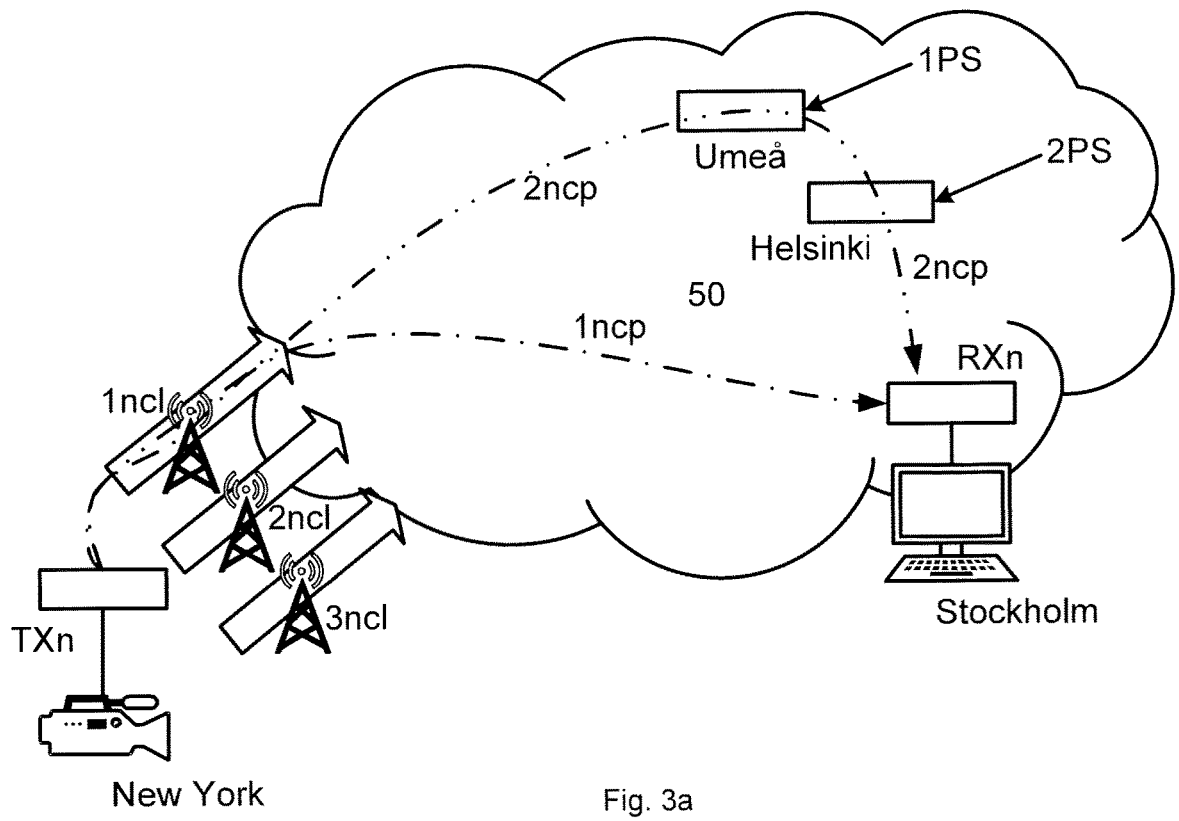
FIG. 3a illustrates a multipath streaming system with two proxy nodes in serial according to an embodiment of the present disclosure.

According to some embodiments the stream of data packets via the second network connection path 2ncp are sent via a first proxy node 1PS and a second proxy node 2PS that are connected in serial for adjusting the route of the second network connection path 2ncp. In an example, as illustrated in FIG. 3a, data packets sent via the second network connection path 2ncp are forced to be routed via Philadelphia and Helsinki before being received by the receiving node RXn in Stockholm.

One advantage with this aspect is that the first proxy node is a physical entity that is placed at a first geographical location and the second proxy node is a physical entity that is placed at a second geographical location, and hence the route of the second network connection path can be controlled to pass via the first geographical location and the second geographical location by adding the second proxy node in serial to the first proxy node.

Figure 3B:
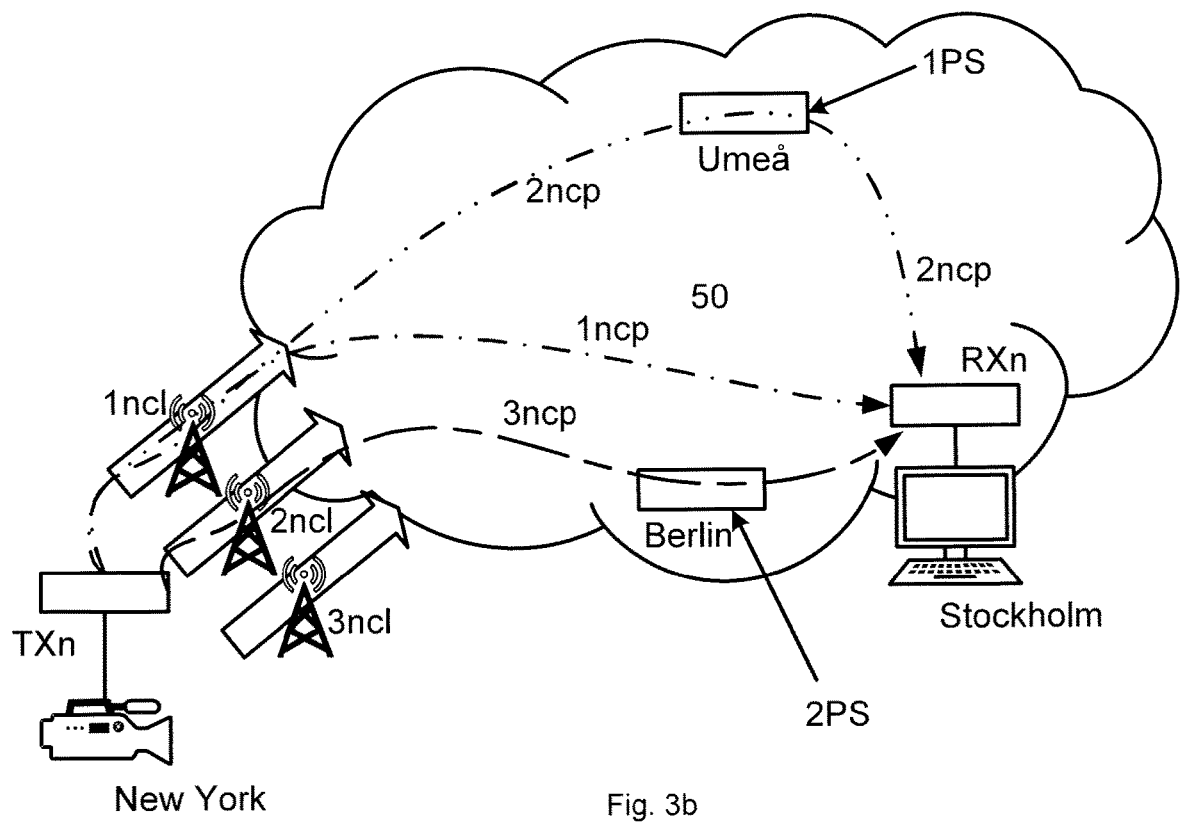
FIG. 3b illustrates a multipath streaming system with two proxy nodes in parallel according to an embodiment of the present disclosure.

According to some embodiments the stream of data packets is sent from the transmitting node TXn to the receiving node RXn via a third network connection path 3ncp wherein the third network connection path 3ncp directs the stream of data packets via a second proxy node 2PS that is connected in parallel to the first proxy node 1PS. In an example, as illustrated in FIG. 3b, data packets sent via the second network connection path 2ncp are forced to be routed via Reykjavik before being received by the receiving node RXn in Stockholm and data packets sent via the third network connection path 3ncp are forced to be routed via Berlin before being received by the receiving node RXn in Stockholm. In the example as illustrated in FIG. 3b, the first network connection path 1ncp and the second network connection path 2ncp are both enabled via the first network connection link 1ncl, while the third network connection path 3ncp is enabled via the second network connection link 2ncl.

One advantage with this aspect is that the first proxy node is a physical entity that is placed at a first geographical location and the second proxy node is a physical entity that is placed at a second geographical location, and hence the route of the second network connection path can be controlled to pass via the first geographical location and the route of the third network connection path can be controlled to pass via the second geographical location by adding the second proxy node in parallel to the first proxy node and thereby control the route of a second redundant stream of data packets.

According to some embodiments the stream of data packets sent via the first network connection path 1ncp is sent as a redundant stream of data packets via the at least second network connection path 2ncp, . . . , nncp for generating a redundant stream of data packets.

One advantage with this aspect is that the first network connection path and the at least second network connection path together establishes a more reliable stream of data packets and further added network connection paths, add further redundancy which makes the multipath streaming system even more reliable.

Figure 4:
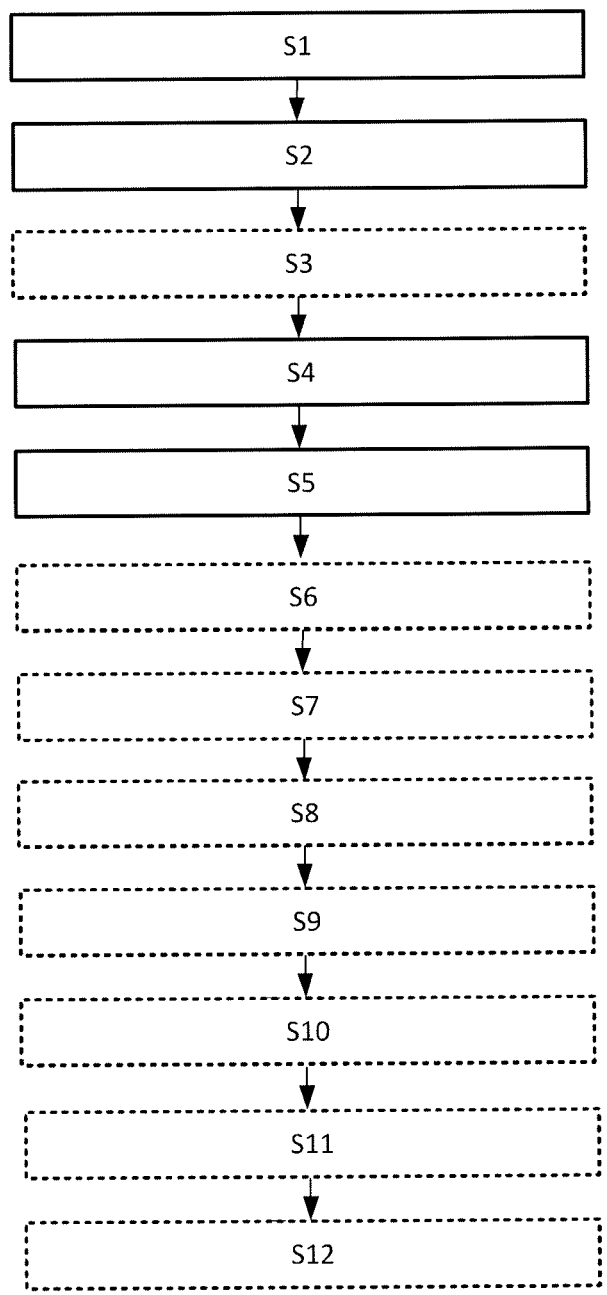
FIG. 4 illustrates a flow chart of the method steps according to the second aspect of the disclosure.
Figure 5:
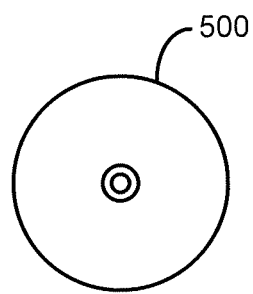
FIG. 5 illustrates a processing circuitry program product according to the third aspect of the disclosure.

The second aspect of this disclosure shows a method for providing at least one stream of data packets for media and/or video from a transmitting node TXn to a receiving node RXn. FIG. 4 illustrates a flow chart of the method steps according to the second aspect of the disclosure. The method comprising the step of S1 sending data packets from a transmitting node TXn to a receiving node RXn via a first network connection path 1ncp, wherein the first network connection path 1ncp is a point-to-point network connection path between the transmitting node TXn and the receiving node RXn, and the step of S2 sending data packets from the transmitting node TXn to the receiving node RXn via at least one proxy node 1PS, 2PS, . . . , nPS via at least a second network connection path 2ncp. The method further comprising the step of S4 receiving, at the receiving node RXn, data packets from the transmitting node TXn via the first network connection path 1ncp, and the step of S5 receiving, at the receiving node RXn, data packets from the transmitting node TXn sent via the at least one proxy node 1PS, 2PS, . . . , nPS via the at least second network connection path 2ncp.

One advantage with this aspect is that data packets received from the transmitting node are relayed to the receiving node by the at least one proxy node which forces the second network connection path to pass the geographical location of the proxy node to generate a redundant stream of data packets different from the first network connection path that is a point-to-point network connection path between the transmitting node and the receiving node.

According to some embodiments the method comprises the step of S3 sending data packets from the transmitting node TXn to the receiving node RXn via the first network connection path 1ncp, and sending data packets from the transmitting node TXn to the receiving node RXn via the second network connection path 2ncp simultaneously, and the step of S6 aggregating data packets received via the first network connection path 1ncp and data packets received via the second network connection path 2ncp at the receiving node RXn for generating a redundant stream of data packets.

One advantage with this embodiment is that data packets can be sent from the transmitting node to the receiving node via the first network connection path and at the same time, or within a predetermined time period, redundant data packets can be sent from the transmitting node to the receiving node via the second network connection path and data packets together with redundant data packets can be aggregated at the receiving node for generating a redundant stream of data packets.

According to some embodiments the method comprises the step of S7 detecting, a change in latency or change in loss of data packets in the stream of data packets in any of the first network connection path 1ncp and the second network connection path 2ncp; and the step of S8 adjusting, at the transmitting node TXn, the amount of data packets to be sent via the first network connection path 1ncp and the amount of data packets to be sent via the second network connection path 2ncp based on the change in latency or change in loss of data packets.

One advantage with this embodiment is that the amount of data packets to be sent via the first network connection path and the amount of data packets to be sent via the second network connection path, can be dynamically balanced in order to generate a useful redundant stream of data packets via any of the first network connection path and the second network connection path dependent on historically detected changes in latency and/or historically detected changes in data packet loss for each connection path.

According to some embodiments the method comprises the step of S9 detecting, a change in latency or change in loss of data packets in the stream of data packets in any of the first network connection path 1ncp and the second network connection path 2ncp, and the step of S10 adjusting, at the transmitting node TXn, the amount of data packets to be sent via a first network connection link 1ncl and a second network connection link 2ncl based on the change in latency or change in loss of data packets in any of the first network connection path 1ncp and the second network connection path 2ncp.

One advantage with this embodiment is that the amount of data packets to be sent via the first network connection link and the amount of data packets to be sent via the second network connection link, can be dynamically balanced in order to generate a useful redundant stream of data packets via any of the first network connection link and the second network connection link dependent on historically detected changes in latency and/or historically detected changes in data packet loss in any of the first network connection path and the second network connection path.

According to some embodiments method comprises the step of S11 obtaining a desired priority rank parameter for transmitting data packets via any of the at least one network connection link 1ncl, 2ncl, . . . , nncl and/or the at least one proxy node 1PS, 2PS, . . . , nPS, and the step of S12 adjusting, at the transmitting node TXn, the amount of data packets to be sent via the at least one network connection link 1ncl, 2ncl, . . . , nncl and/or the at least one proxy node 1PS, 2PS, . . . , nPS based on the desired priority rank parameter.

One advantage with this embodiment is that the amount of data packets to be sent via the at least one network connection link and/or the amount of data packets to be sent via the at least one proxy node, can be dynamically balanced in order to generate a desired amount of data to be sent via any of the at least one network connection link and/or the at least one proxy node dependent on the desired priority rank parameter.

The third aspect of this disclosure shows a computer program product the second aspect comprising a non-transitory computer readable medium, having thereon a computer program comprising program instructions, the computer program being loadable into a processing circuitry 102a, 102b, 102c and configured to cause execution of the method when the computer program is run by the at least one processing circuitry 102a, 102b, 102c.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A multipath streaming system for providing at least one stream of data packets for media and/or video from a transmitting node to a receiving node, wherein the multipath streaming system comprises:
   a transmitting node configured to transmit data packets via at least two network connection paths;
   a receiving node configured to receive data packets via at least two network connection paths;
   at least one proxy node configured to relay data packets received from the transmitting node to the receiving node; and
   a processing circuitry configured to be operatively connected to at least one of the transmitting node, the receiving node and the at least one proxy node, wherein the processing circuitry is configured to:
      send data packets from the transmitting node to the receiving node via a first network connection path, wherein the first network connection path is a point-to-point network connection path between the transmitting node and the receiving node;
      send data packets from the transmitting node to the receiving node via at least one proxy node via at least a second network connection path;
      send data packets from the transmitting node to the receiving node via the first network connection path, and send data packets from the transmitting node to the receiving node via the second network connection path simultaneously;
      receive, at the receiving node, data packets from the transmitting node via the first network connection path;
      receive, at the receiving node, data packets from the transmitting node sent via the at least one proxy node via the at least second network connection path; and
      aggregate data packets received via the first network connection path and data packets received via the second network connection path at the receiving node for generating a redundant stream of data packets.

2. The multipath streaming system according to claim 1, wherein the processing circuitry is further configured to:
   detect a change in latency or detect a change in loss of data packets in the stream of data packets in any of the first network connection path and the second network connection path; and
   adjust, at the transmitting node, the amount of data packets to be sent via the first network connection path and the amount of data packets to be sent via the second network connection path based on the change in latency or change in loss of data packets.

3. The multipath streaming system according to claim 1, wherein the at least one network connection path is established via at least one network connection link connecting the transmitting node with the network.

4. The multipath streaming system according to claim 3, wherein the processing circuitry is further configured to:
   detect a change in latency or detect a change in loss of data packets in the stream of data packets in any of the first network connection path and the second network connection path; and
   adjust, at the transmitting node, the amount of data packets to be sent via a first network connection link and a second network connection link based on the change in latency or change in loss of data packets in any of the first network connection path and the second network connection path.

5. The multipath streaming system according to any of the claim 4, wherein the processing circuitry is further configured to:
   obtain a desired priority rank parameter associated with transmitting data packets via any of the at least one network connection link and/or the at least one proxy node; and
   adjust, at the transmitting node, the amount of data packets to be sent via the at least one network connection link and/or the at least one proxy node based on the desired priority rank parameter.

6. The multipath streaming system according to claim 1, wherein the stream of data packets via the second network connection path are sent via a first proxy node and a second proxy node that are connected in serial for adjusting the route of the second network connection path.

7. The multipath streaming system according to claim 1, wherein the stream of data packets is sent from the transmitting node to the receiving node via a third network connection path wherein the third network connection path directs the stream of data packets via a second proxy node that is connected in parallel to the first proxy node.

8. The multipath streaming system according to claim 1, wherein the stream of data packets sent via the first network connection path is sent as a redundant stream of data packets via the at least second network connection path for generating a redundant stream of data packets.

9. A method for providing at least one stream of data packets for media and/or video from a transmitting node to a receiving node, the method comprising:
   sending data packets from a transmitting node to a receiving node via a first network connection path, wherein the first network connection path is a point-to-point network connection path between the transmitting node and the receiving node;
   sending data packets from the transmitting node to the receiving node via at least one proxy node via at least a second network connection path;
   sending data packets from the transmitting node to the receiving node via the first network connection path, and sending data packets from the transmitting node to the receiving node via the second network connection path simultaneously;
   receiving, at the receiving node, data packets from the transmitting node via the first network connection path;
   receiving, at the receiving node, data packets from the transmitting node sent via the at least one proxy node via the at least second network connection path; and
   aggregating data packets received via the first network connection path and data packets received via the second network connection path at the receiving node for generating a redundant stream of data packets.

10. The method according to claim 9 further comprising:
   detecting, a change in latency or change in loss of data packets in the stream of data packets in any of the first network connection path and the second network connection path; and
   adjusting, at the transmitting node, the amount of data packets to be sent via the first network connection path and the amount of data packets to be sent via the second network connection path based on the change in latency or change in loss of data packets.

11. The method according to any of the claim 10, further comprising:
- detecting, a change in latency or change in loss of data packets in the stream of data packets in any of the first network connection path and the second network connection path; and
- adjusting, at the transmitting node, the amount of data packets to be sent via a first network connection link and a second network connection link based on change in latency or change in loss of data packets in any of the first network connection path and the second network connection path.

12. The method according to claim 11 comprising:
- obtaining a desired priority rank parameter for transmitting data packets via any of the at least one network connection link and/or the at least one proxy node; and
- adjusting, at the transmitting node, the amount of data packets to be sent via the at least one network connection link and/or the at least one proxy node based on the desired priority rank parameter.

13. A computer program product comprising a non-transitory computer readable medium, having thereon a computer program comprising program instructions, the computer program being loadable into a processing circuitry and configured to cause execution of the method according to claim 9, when the computer program is run by the at least one processing circuitry.

* * * * *